(12) United States Patent
Seldon

(10) Patent No.: US 8,061,538 B2
(45) Date of Patent: Nov. 22, 2011

(54) WINE RACK

(76) Inventor: Philip Seldon, New York, NY (US)

( * ) Notice: Subject to any disclaimer, the term of this patent is extended or adjusted under 35 U.S.C. 154(b) by 366 days.

(21) Appl. No.: 12/001,880

(22) Filed: Dec. 13, 2007

(65) Prior Publication Data

US 2009/0152222 A1   Jun. 18, 2009

(51) Int. Cl.
*A47B 73/00* (2006.01)
(52) U.S. Cl. .......................................... 211/74; 220/509
(58) Field of Classification Search ............... 211/74, 211/189, 195, 184, 75, 76, 126.11, 126.12, 211/85.18, 60.1, 188, 194; 220/4.33, 4.29, 220/4.28, 507, DIG. 2, 224; 206/733, 427, 206/588, 562, 821; 312/258, 259, 262, 263, 312/265.5, 257.1, 264; 403/329; 108/158.12
See application file for complete search history.

(56) References Cited

U.S. PATENT DOCUMENTS

| | | | | |
|---|---|---|---|---|
| 3,606,023 | A * | 9/1971 | Edmunds | 211/74 |
| 4,153,311 | A * | 5/1979 | Takahashi | 312/107 |
| 4,809,851 | A * | 3/1989 | Oestreich et al. | 206/599 |
| 4,832,421 | A * | 5/1989 | Shoffner | 312/263 |
| 5,947,305 | A * | 9/1999 | Lin | 211/74 |
| 6,595,378 | B2 * | 7/2003 | Wang | 211/189 |
| 6,918,502 | B1 * | 7/2005 | Overholt et al. | 220/6 |
| 7,140,149 | B2 * | 11/2006 | Searle et al. | 47/65.5 |
| 7,243,674 | B2 * | 7/2007 | Devine | 137/375 |
| 7,254,952 | B2 * | 8/2007 | Lilke | 62/3.6 |
| 7,264,122 | B2 * | 9/2007 | Koefelda et al. | 206/600 |
| 7,506,771 | B2 * | 3/2009 | Bianchini | 211/75 |
| 2003/0178381 | A1 * | 9/2003 | Liang | 211/74 |
| 2004/0159659 | A1 * | 8/2004 | Rumpel | 220/7 |
| 2005/0011843 | A1 * | 1/2005 | Dagan | 211/74 |
| 2007/0017884 | A1 * | 1/2007 | Yang | 211/74 |
| 2007/0108143 | A1 * | 5/2007 | Kilduff | 211/74 |
| 2007/0108145 | A1 * | 5/2007 | Milardo et al. | 211/74 |

OTHER PUBLICATIONS

1970, Photographs of prior art wine rack.

* cited by examiner

*Primary Examiner* — Janet M Wilkens
*Assistant Examiner* — Daniel Rohrhoff
(74) *Attorney, Agent, or Firm* — Jordan and Hamburg LLP

(57) ABSTRACT

Wine storage system including a front panel, a back panel, and two side panels. The wine storage system can be in an assembled or disassembled state and can be assembled or disassembled by a user. When assembled, the wine storage system takes the form of a wine rack. The front panel and back panel each comprise a plurality of wine bottle apertures configured to receive wine bottles. The design of the wine storage system is such that when the wine rack is assembled, the wine bottle apertures of the front panel correspond to wine bottle apertures of the back panel to form a support structure for the wine bottles to be placed at an incline or a substantially horizontal position in the wine rack.

10 Claims, 11 Drawing Sheets

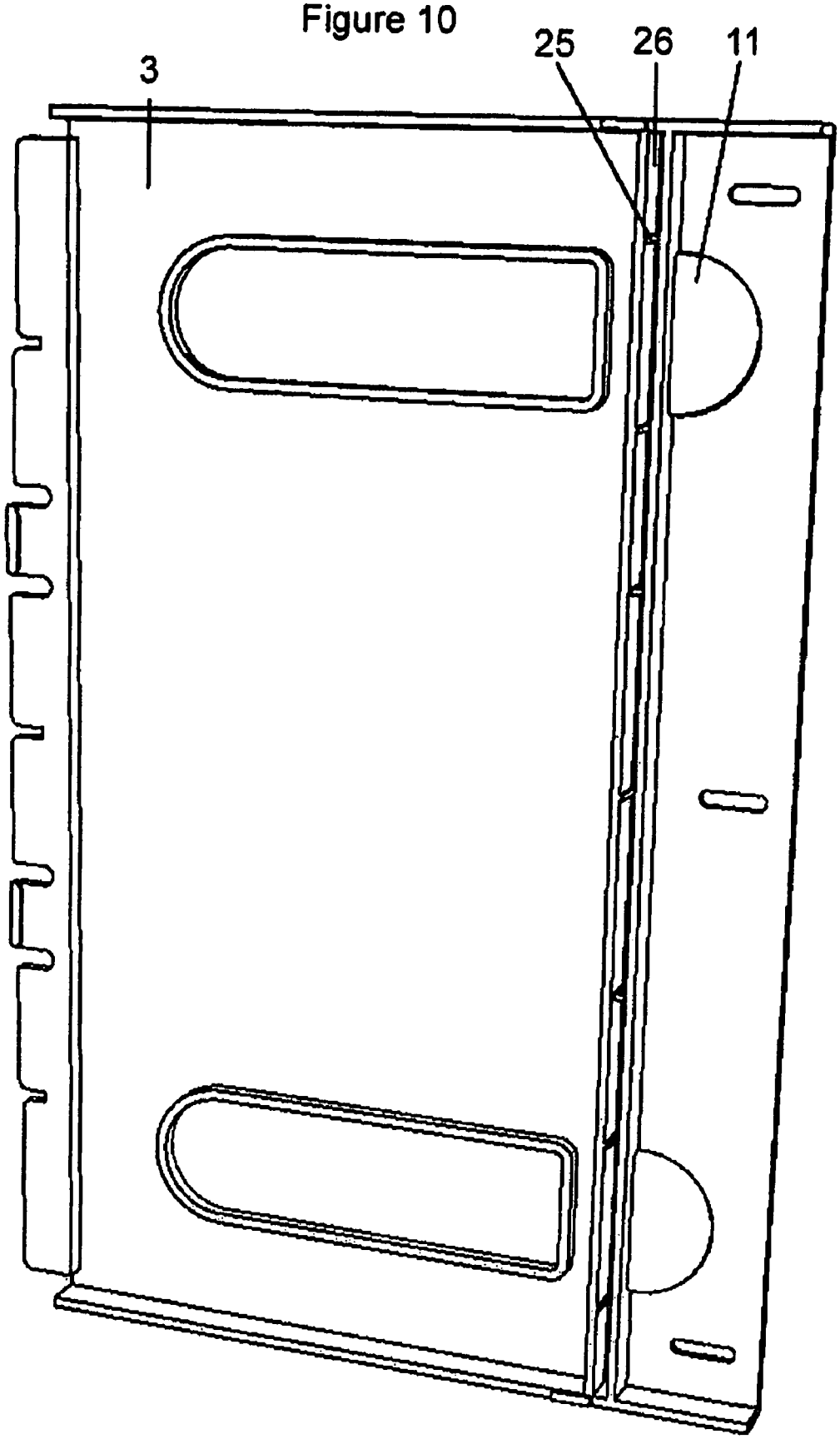

1

WINE RACK

BACKGROUND OF THE INVENTION

Wine racks are utilized as a convenient way to store wine. Although assemblable wine racks are known, the present invention includes a number of advantageous characteristics that are new. For example, the present invention is designed for improved sturdiness. Additional aspects of the invention are described below.

SUMMARY OF THE INVENTION

The present invention is directed to a wine storage system. The wine storage system includes a front panel, a back panel, and two side panels. The wine storage system can be either assembled or disassembled. When disassembled, the front panel, the back panel, and the two side panels are not attached to one another and this allows for easier storage and transportation of the wine storage system. When assembled, the wine storage system takes the form of a wine rack. The front panel and back panel each comprise a plurality of wine bottle apertures configured to receive wine bottles, the wine bottle apertures of the front panel correspond to wine bottle apertures of the back panel to form a support structure for the wine bottles to be placed at an incline or a substantially horizontal position in the wine rack. The planes defined by the side panels are substantially parallel to one another and the planes defined by the front panel and the back panel are substantially parallel to one another, and the planes defined by the front and back panels are substantially perpendicular to the planes defined by the side panels.

Each side panel comprises at least one fit aperture. The back panel comprises at least one back panel protrusion comprising a step. The back panel protrusion protrudes through the fit aperture to attach the back panel to the side panel by forming a snap fit by engagement of the step and structure adjacent to the fit aperture.

An edge portion of each of the side panels is inserted between at least two ledges on the front panel to limit the side panels from moving past the ledges. The side panels comprise an inner surface which faces inside the wine rack and an outer surface which faces outside the wine rack and each inner surface and each outer surface of each of the side panels faces at least one ledge and is adjacent to the ledge.

The front panel comprises one or more protrusions on each side of the front panel. Each side panel comprises one or more notches. At least one of the protrusions on each side of the front panel is inserted into a respective notch of a side panel to limit the side panels from moving in a direction towards a top edge or bottom edge of the front panel substantially along planes defined by the side panels.

The front panel comprises one or more engagement portions on each side of the front panel, each engagement portion defining an engagement opening. Each of the side panels comprises at least one side panel protrusion which comprises an engagement step. The front panel and side panels are configured and assembled so that the engagement step on each of the side panels is at least partly inserted into a respective engagement opening defined by the engagement portion so as to limit the side panels from moving away from the front panel in a direction substantially along the planes defined by the side panels.

Each side panel can comprises at least one handle opening that forms a handle for carrying the wine rack. Each side panel can also comprise at least one recess configured to engage the step and on which a finger can be slid to release the step. The front panel and back panel each can comprise a lip. Each of the lips is on a top side of the wine rack. Each of the lips extends in a direction substantially coplanar to the front panel and back panel, respectively. The lips are configured such that another wine rack can be placed on top of the wine rack and be held in place by the lips of the bottom wine rack.

The side panels and the back panel can be attached to one another such that peripheral edges of the back panel are adjacent to and face inner surfaces of said side panels. The side panels and the front panel can be attached to one another such that a peripheral edge of each of said side panels is adjacent to and faces an inner surface of the front panel.

Each of the side panels can comprise one or more holding structures carried on a surface facing inwardly of the rack. The back panel can comprises one or more notches. At least one of the holding structures on each of the side panels can be inserted into a respective notch of each of the back panels to substantially limit the side panels from moving in a vertical direction relative to the back panel.

BRIEF DESCRIPTION OF THE DRAWINGS

FIG. 10 shows a surface of a side panel which will face inside of the wine rack.

DETAILED DESCRIPTION OF THE INVENTION

Figure 1:
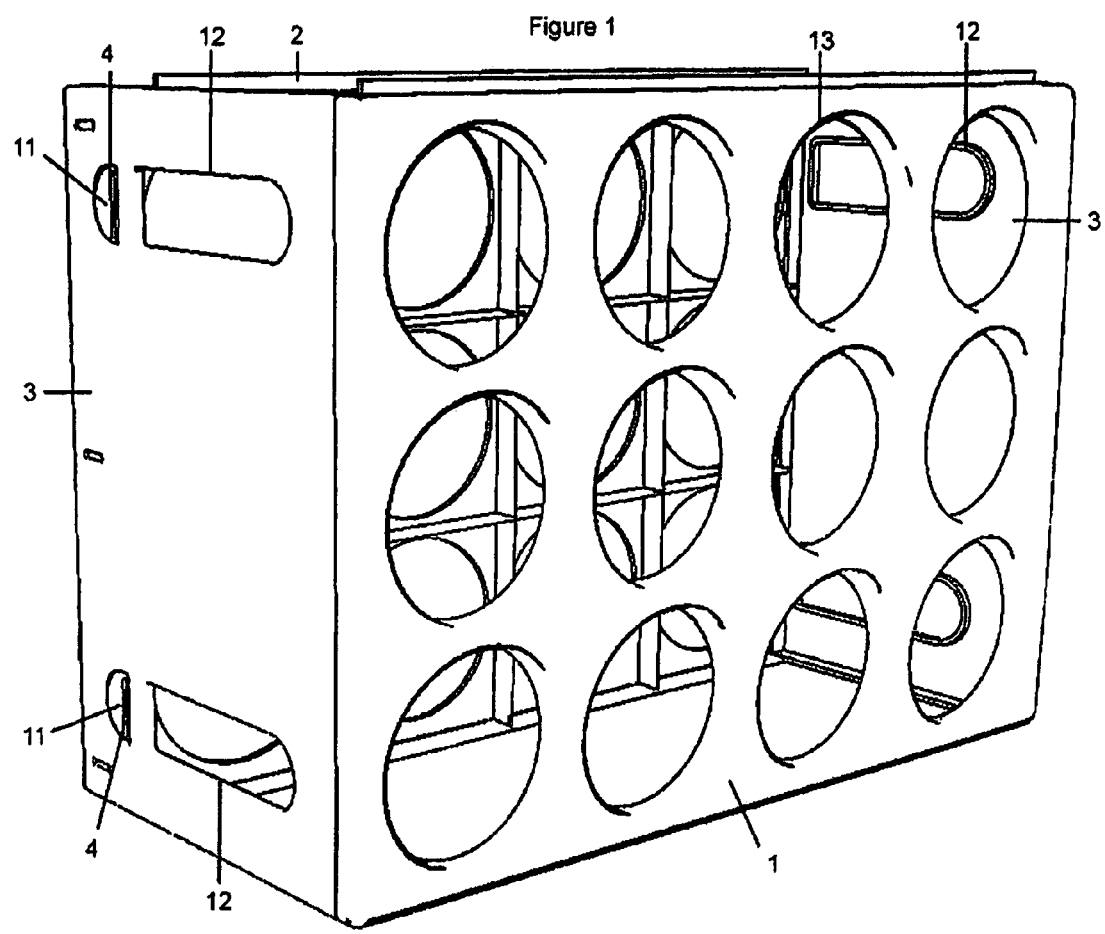
FIG. 1 shows a perspective view of the wine rack.
Figure 3:
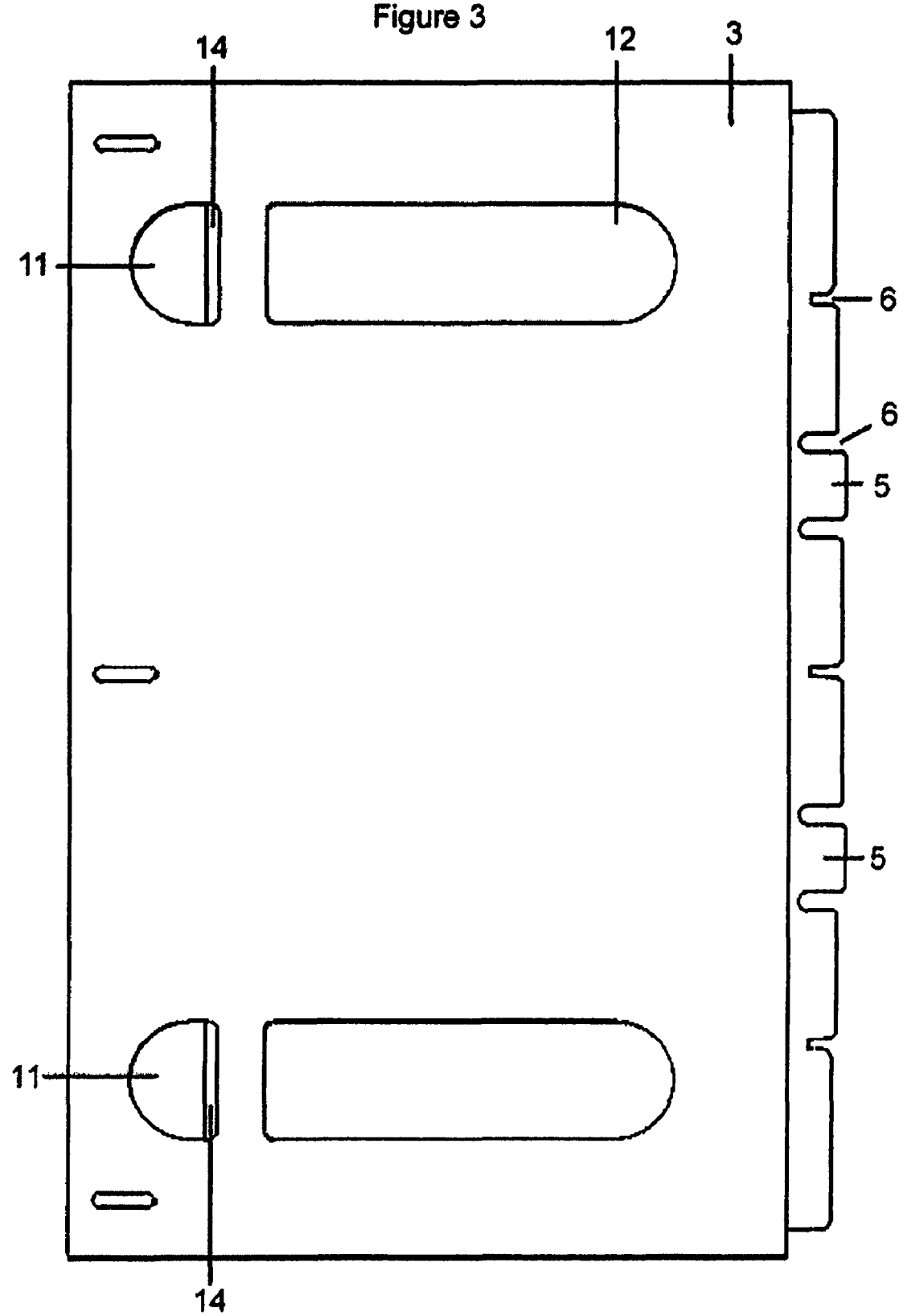
FIG. 3 shows a surface of a side panel which will face the outside of the wine rack upon assembly of the wine rack.
Figure 8:
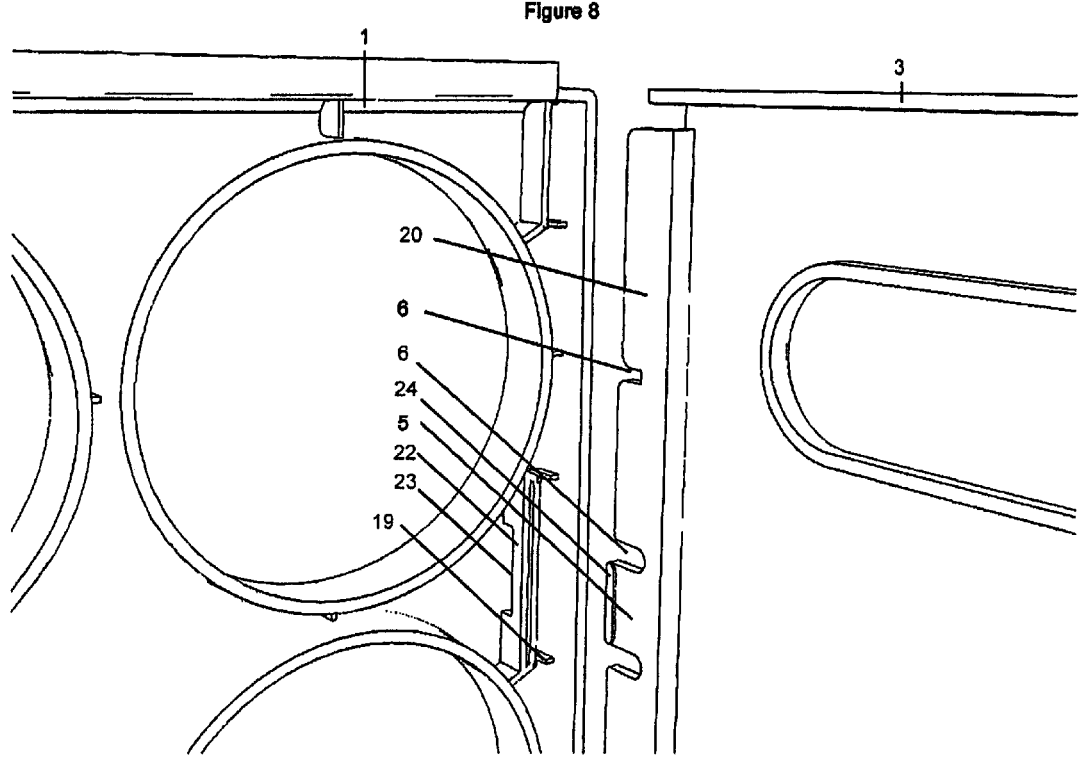
FIG. 8 shows a perspective view of a portion of the wine rack to demonstrate the attachment of the side panels to the front panel.
Figure 9:
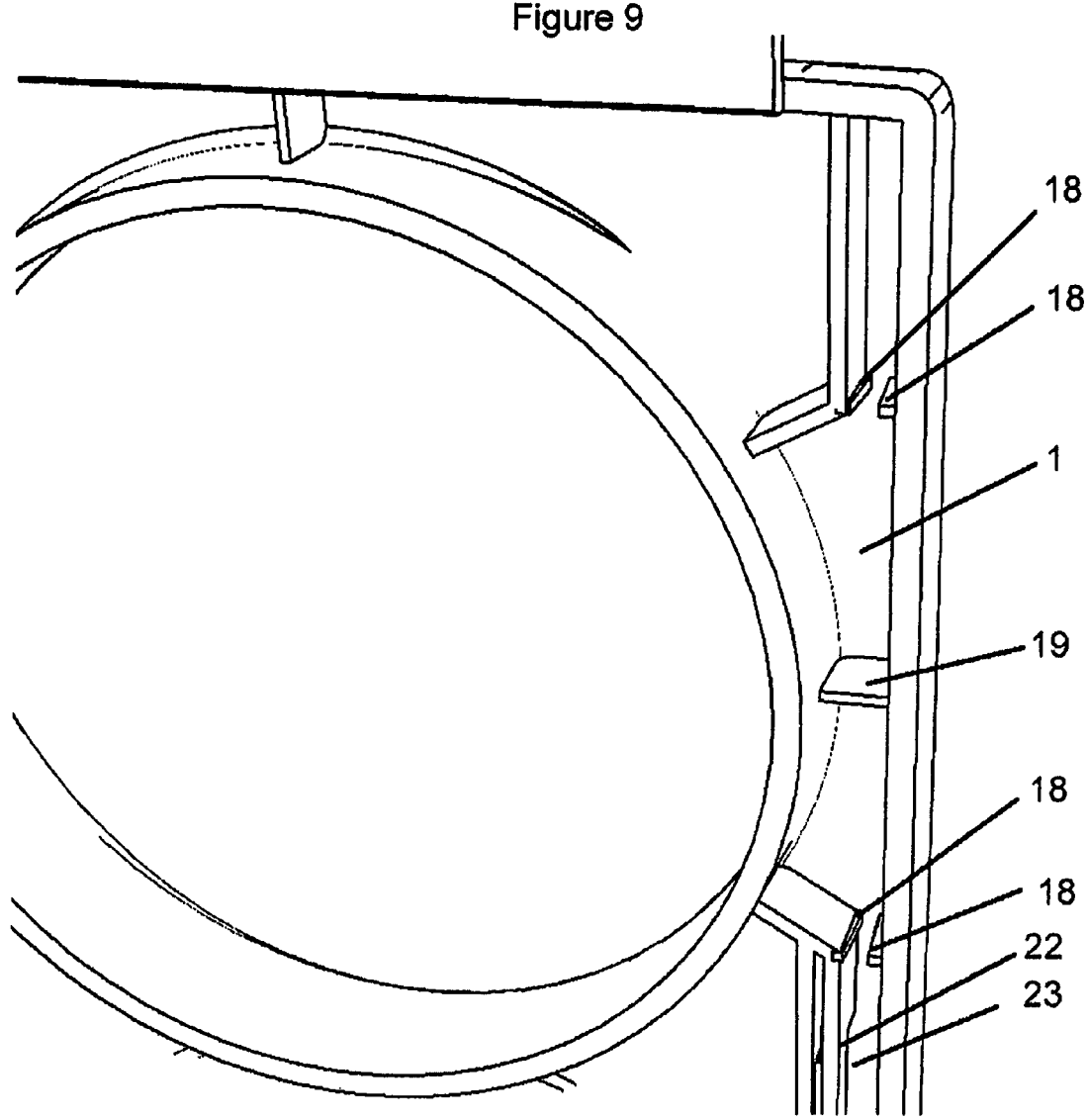
FIG. 9 shows a portion of an inside surface of the front panel to demonstrate the attachment of the side panels to the front panel.

FIG. 1 shows a perspective view of the wine rack. FIG. 1 includes the following items: front panel 1, back panel 2, side panel 3, back panel protrusion 4, recess 11, handle aperture 12, and wine bottle aperture 13. The wine rack is not limited to these elements since they are merely the elements specifically identified with number designations in FIG. 1. The wine rack will have one front panel 1 and one back panel 2 and two side panels 3. The back panel protrusion 4 is a protrusion that extends from the back panel 2 and into an opening on the side panel 3 (see FIG. 3, item 14). The back panel 2 has one, two, or more back panel protrusions 4 on each side for attaching to two side panels 3. The opening of the side panel 3 into which the back panel protrusion 4 goes into is referred to as a fit aperture 14, as shown in FIG. 3. The recess 11 is a portion of the side panel 3 that can help a finger slide in order to release the back panel protrusion 4. By pushing the portion of the back panel protrusion 4 (which includes step 21) in a direction so as to undo the snap fit, the back panel protrusion 4 will loosen and can then be separated from the side panel 3. Thus, the wine rack can be taken apart after it has been assembled. The recess 11 helps the back panel protrusion 4 be less prominent on the surface of the side panel 3 since the snap fit between the back panel protrusion 4 and the side panel 3 is done on the recess 11. The front panel 1 is connected to the side panels 3, which are in turn connected to the back panel 2. Both the front and back panels have wine bottle apertures for placing the wine bottles. The wine bottle apertures of the front panel correspond to the wine apertures of the back panel to be able to support wine bottles which extend from the front panel to the back panel. This permits the placement of the wine bottles in a horizontal or an inclined position in the wine rack. With reference to FIGS. 8 and 9, the front panel 1 defines a front panel circumferential shelf adjacent the apertures and extending from a front face of the front panel to a back face of the front panel so as to form a circumferential extension protruding from the back face of the front panel toward the back panel at a predetermined distance to hold a bottle of wine thereat, and the circumferential extension of each of the circumferential shelves defines a circumferential rim portion including a circumferential terminal end surface of the circumferential extension. Handle apertures 12 are designed to define handles for lifting the wine rack. FIG. 1 shows two handle apertures 12 on each of the side panels 3. It is possible to have 0, 1, 2, or more than 2 handle apertures 12, but two are preferred on each side panel 3, one near the top and one on near bottom of the side panels 3. The front and back panels are substantially parallel to one another. The side panels can be substantially parallel to one another and in this case, the back panel is smaller in a direction from one side panel to the other side panel than the front panel. Alternatively, if the side panels are at a slight angle to one another, then the wine rack can be made such that the front and back panels are the same length. This occurs because the side panels and the back panel can be attached to one another such that a peripheral edge of the back panel is adjacent to and faces an inner surface of said side panels while the side panels and the front panel are attached to one another such that a peripheral edge of each of said side panels is adjacent to and faces an inner surface of said front panel.

Figure 2:
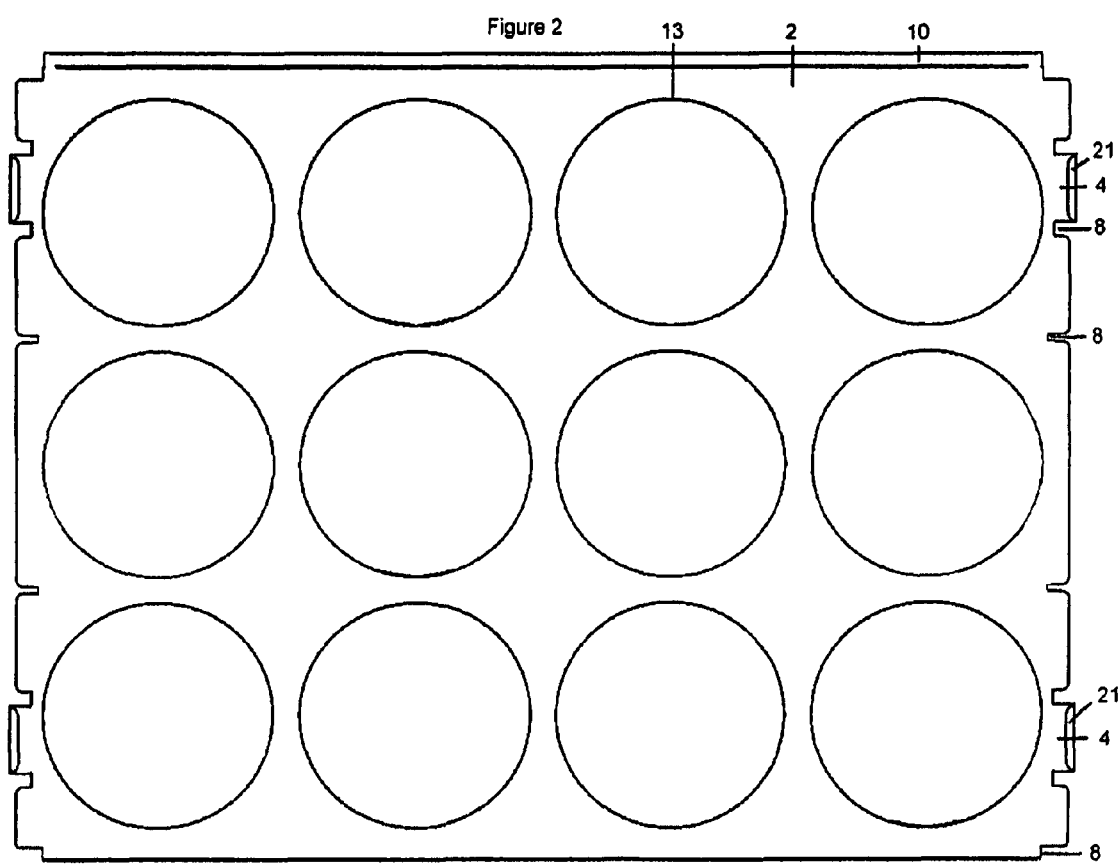
FIG. 2 shows a surface of the back panel which will face the outside of the wine rack upon assembly of the wine rack.

FIG. 2 shows the back panel 2. Included, but not limited to, are back panel 2, back panel protrusion 4, back panel notch 8, lip 10, wine bottle aperture 13, and step 21. The back panel protrusions 4 include a step 21 that can be at an outermost edge of the back panel protrusions 4 or slightly away from the outermost edge of the back panel protrusions 4. The outermost edge of step 21 has a particular thickness and this thickness increases in a direction extending away from the main body portion of the back panel 2 and decreases along its extent in a direction towards the back panel such that the decrease in thickness is sufficiently rapid to define the step 21 as part of the back panel protrusion 4. The step 21 can be found on the part of the back panel protrusion 4 which faces the front panel 1 when the wine rack is assembled or can be on the part of the back panel protrusion 4 which faces away from the front panel 1. When the back panel protrusion 4 is inserted into the fit aperture 14, once the step 21 penetrates through the fit aperture 14, the step 21 will catch onto an edge of side panel structure adjacent to the fit aperture 14 and keep the back panel 2 from moving away from the side panel 3 in along a direction which is substantially along the plane of the back panel 2. There are one, two or more back panel protrusions 4 on each side of the back panel 2. If, after assembly of the wine rack, the recess 11 can be pressed to glide a finger or other object to move the step 21 to unlatch from the fit aperture 14 The same can be done for every recess 11 on any of the side panels 3. The maximum thickness of the portion of the back panel protrusion 4 (including step 21) that is inserted into the fit aperture 14 may be around the same or just barely larger than the fit aperture 14 in order permit the insertion of the back panel protrusion 4 into the fit aperture 14 to secure a tight fit, but also to permit the disassembly of the wine rack. Thus, the type of connection which connects the side panel 3 and the back panel 2 is a snap connection. It is also possible, however, to not utilize the step 21 and to instead have a press fit connection.

The diagram of FIG. 2 shows the step 21 which will be used to form a snap connection. The lip 10 is an extension of the back panel 2 that when assembled, will extend beyond the height of the side panels 3. The lip 10 has the purpose of providing a way to stack one wine rack ("upper wine rack") over another wine rack ("lower wine rack") and to provide structural support to the upper wine rack, especially to keep the upper wine rack from moving and/or falling. The lip 10 will extend such that if the upper wine rack is put on top of the lower wine rack where the lip 10 is, the lip 10 will end up inside the upper wine rack and will help stabilize the upper wine rack from movement. Thus, the lip 10 is configured such that if an upper wine rack is placed on top of the lower wine rack where lip 10 is, lip 10 will be inside the upper wine rack rather than being directly underneath the back panel 2 of the upper wine rack. Possible ways of doing this is to place the lip 10 such that it is not flush against the outside surface of the back panel 2 (i.e., the lip 10 is spaced from the outside surface of the back panel 2) and/or making it be at an angle towards the inside of the upper wine rack when assembled. The back panel 2 also has back panel notches 8. The side panel 3 has holding structures 25 (see FIG. 10) which interlock with the back panel notches 8 to keep the side panel 3 from moving up and down relative to the back panel 2 along a direction substantially along a plane defined by the side panel 3.

FIG. 3 is a figure showing a side panel 3. Both of the side panels 3 on the wine rack can be substantially the same except for their orientation when the wine rack is assembled. FIG. 3 includes, but is not limited to, the following: side panel 3, recess 11, side panel protrusion 5, side panel notch 6, handle aperture 12, and fit aperture 14. The fit aperture 14 is where the back panel protrusion 4 gets inserted. Recess 11 can be pressed to help slide a finger to release the back panel protrusion 4 to disassemble the wine rack. Side panel notch 6 can be utilized in combination with the front panel protrusion 19 (see FIG. 9) to keep the side panel 3 from moving from top to bottom (i.e., to keep the side panel 3 from moving towards or away from the top and bottom edges of the front panel 1). The side panel 3 can have one or more side panel notches 6, zero, one, or more handle apertures 12, one or more fit apertures 14 (preferably 2), and zero, one or more recesses 11 (preferably 2).

Figure 4:
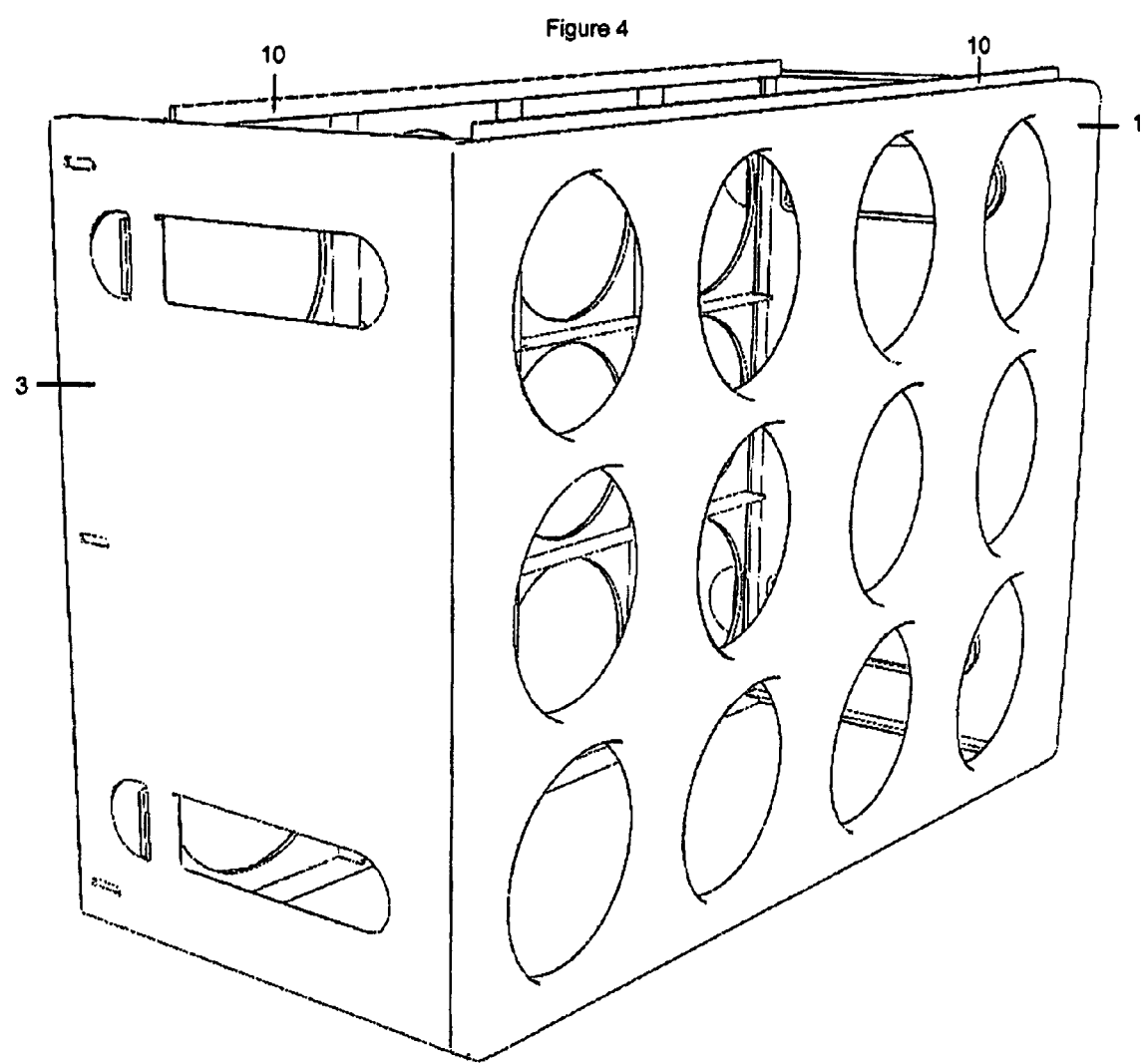
FIG. 4 shows a perspective view of the wine rack when assembled.

FIG. 4 shows a perspective view of the wine rack when assembled, including but not limited to: side panel 3, front panel 1, and lips 10. The lips 10 can be found as extensions of the back and/or front panels. As explained above, the lips 10 are assembled such that when an upper wine rack is put on a lower wine rack, the lips 10 of the lower wine rack will be inside the upper wine rack and will help keep secure and keep the upper wine rack from moving. Thus, the lips 10 are configured such that their topmost surfaces do not fall directly below the front panel 1 and back panel 2 of the wine rack that is to be placed on top. This can be done by placing the lips 10 spaced from an outside surface of the front panel 1 and the back panel 2. Another option is to make the lips 10 be at an inward angle.

Figure 5:
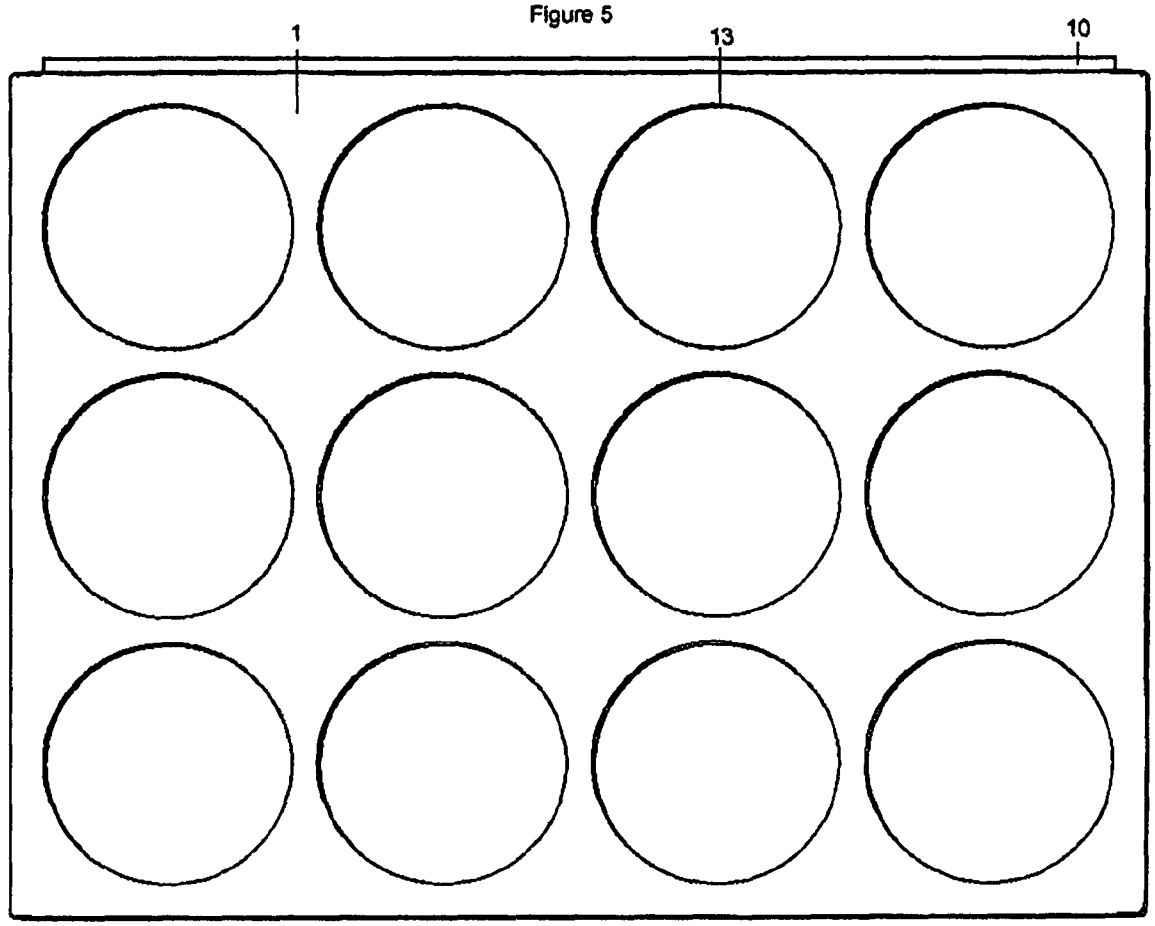
FIG. 5 shows the front panel.

FIG. 5 shows the front panel 1, including but not limited to: front panel 1, wine bottle aperture 13, and lip 10. These items have been described above.

Figure 6:
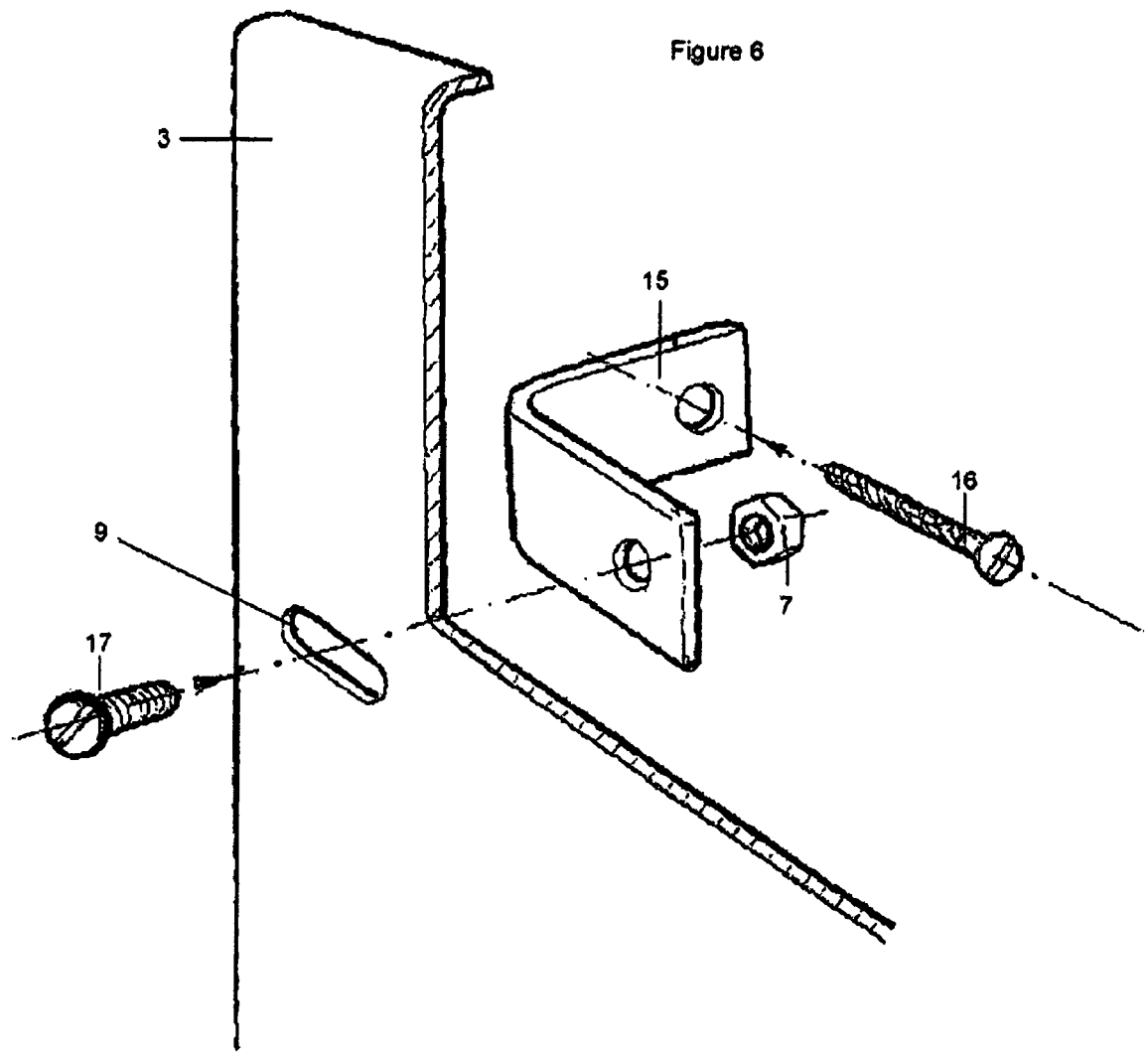
FIG. 6 shows the use of a metal bracket to attach the wine rack to a wall or other surface for support.

FIG. 6 shows the use of a metal bracket to attach the wine rack to a wall or other surface for additional support. FIG. 6 includes, but is not limited to: side panel 3, side panel aperture 9, mechanical screw 17, nut 7, screw 16, and metal bracket 15. One or more side panels 3 can be attached to a wall with a metal bracket 15. Thus, the wine rack has three different configurations. Completely disassembled, which facilitates shipping, assembled and attached to a wall, and assembled and free-standing. The assembled wine rack which is attached to a wall is configured such that a portion of the metal bracket 15 is attached to a wall or other vertical structure with the screw 16. Another portion of the metal bracket 15 is attached to the side panel 3 with the mechanical screw 17 and the nut 7, where the mechanical screw 17 can be inserted through the side panel aperture 9. Thus, the metal bracket 15 is attaching the side panel 3 to a wall or other vertical surface or other surface. The side panels can have zero, one, two, three, or more side panel apertures 9.

Figure 7:
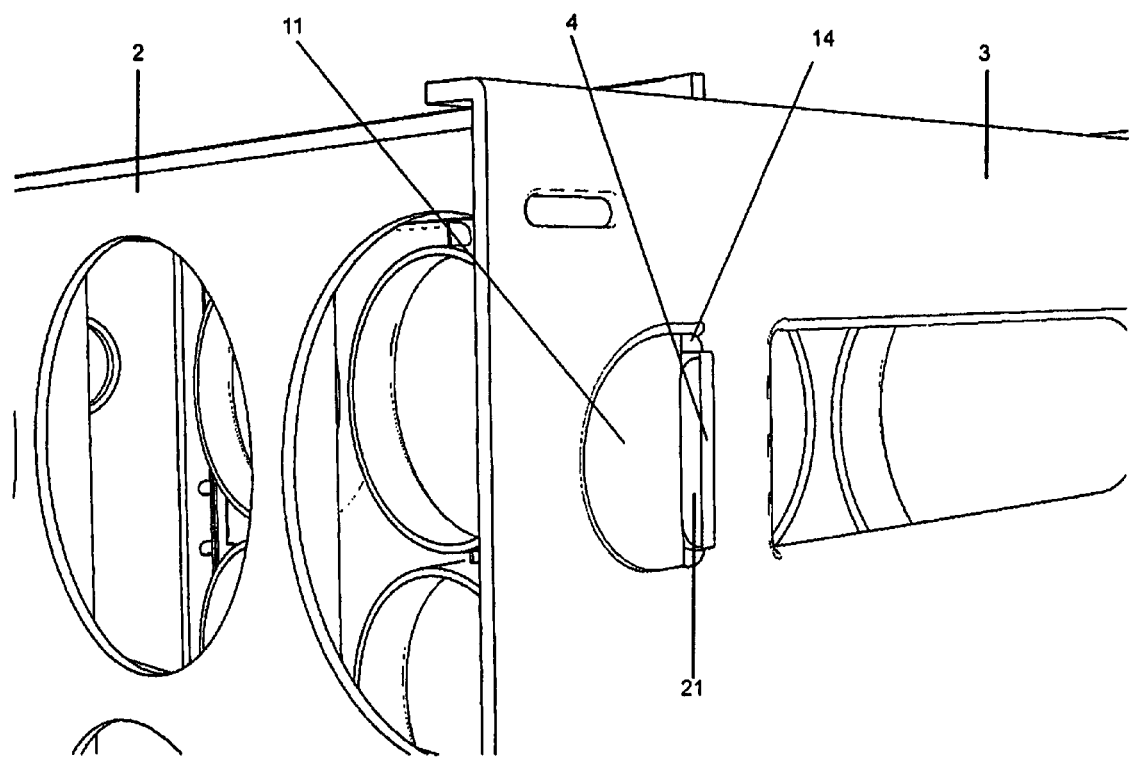
FIG. 7 shows a perspective view of a portion of the wine rack to demonstrate the attachment of the back panel to the side panels.

FIG. 7 shows a perspective view of a portion of the wine rack to demonstrate the attachment of the back panel 2 to the side panel 3. FIG. 7 includes, but is not limited to: back panel 2, side panel 3, recess 11, back panel protrusion 4, step 21, and fit aperture 14. As can be seen in FIG. 7, the back panel protrusion 4 includes a step 21 at its extremity. The step 21 is on a surface of the back panel protrusion 4 which faces away from the front panel 1. The step 21 can be on a surface of the back panel protrusion 4 facing the front panel 1 or facing away from the front panel 1. The step 21 on the back panel protrusion 4 creates a snap connection such that the step 21 abuts the edge of the fit aperture 14 and keeps the back panel 2 and the side panel 3 from moving away from each other. In the situation where there is a recess 11 to facilitate pushing the back panel protrusion 4, the step 21 is in contact with the recess 11. If a finger or other object is slid across the recess 11 towards the back panel protrusion 4 and the portion of the back panel protrusion 4 which protrudes through the fit aperture is pressed with sufficient strength, the engagement of the step 21 is removed the back panel protrusion 4, including step 21, can be pulled out of the fit aperture 14 to disassemble the wine rack. The edge of recess 11 can be the same as the edge of the fit aperture 14. Also, the surface of the recess 11 is at a lower level than the surface of the side panel 3 such that the back panel protrusion 4, when engaged to the recess 11, protrudes less prominently with respect to the surface of the side panel 3.

FIG. 8 shows the connection between the side panel 3 and the front panel 1 and includes, but is not limited to: front panel 1, side panel 3, side panel protrusion 5, side panel notch 6, front panel protrusion 19, edge portion 20 of the side panel 3, engagement portion 22, engagement opening 23, and engagement step 24. The side panel 3 is attached to the front panel 1. The side panel protrusion 5 includes engagement step 24. Engagement step 24 is similar to the step 21. The outermost edge of the engagement step 24 can be the same as the edge of the side panel protrusion 5 or can be inward from the edge of the side panel protrusion 5. The engagement step 24 has a thickness which increases in a direction extending away from the main body portion of the side panel 3 and decreases along its extent in a direction towards the side panel 3 such that the reduction in thickness of engagement step 24 is sufficiently rapid to define the engagement step 24 as part of the side panel protrusion 5. The engagement step 24 can be on the part of the side panel protrusion 5 which faces the inside and/or outside of the wine rack (when assembled). Engagement portion 22 is on the front panel 1 and is made to define engagement opening 23. The engagement portion 22 has a bridge-like shape which defines the engagement opening 23. When the side panel 3 is attached to the front panel 1, the side panel protrusion 5 will be adjacent to the engagement portion 22 and the engagement step 24 will be, at least in part, inside the engagement opening 23. Thus, the engagement step 24 will keep the side panel 3 from moving away from the front panel 1 substantially along the plane defined by the side panel 3 because the engagement step 24 is inside the engagement opening 23 and engages the engagement opening 23. The front panel protrusion 19 will be inserted into the side panel notch 6 and will keep the side panel 3 from moving up and down relative to the front panel 1 substantially along the plane defined by side panel 3. In other words, the side panel notch 6 and the front panel protrusion 19 will be engaged to keep the side panel 3 from moving towards and away from the top and bottom of the front panel substantially along planes defined by the side panels 3.

FIG. 9 shows a portion of the front panel 1 and includes, without limitation, ledges 18, front panel protrusion 19, engagement portion 22, and engagement opening 23. The side panel 3 is attached to the front panel 1 such that the edge portion 20 of the side panel 3 is between a pair of ledges 18. It is possible to have only one or no ledges and have a different portion of the front panel 1 support the side panel 3 instead of one or both of the ledges. Also, there can be more than one ledge 18 or ledge pairs on the front panel 1. The ledges 18 can come in pairs where each ledge 18 of the pair faces the other ledge 18 of the pair for insertion of the edge portion 20 of the side panel 3 between a pair of ledges 18 which face one another. The ledge pairs do not have to be facing one another and can be on the front panel 1 and on either side of the side panels 3 and do not have to face one another (i.e., each ledge 18 of a pair of ledges 18 can be at a different position such that they do not face each other). Thus, the ledges 18 can be in pairs (either facing each other or not), or not in pairs. Preferably, the ledges are present in pairs which face one another. The ledges 18 keep the side panels 3 from moving past the ledges 18. Thus, the side panels 3 cannot move from side to side relative to the front panel 1 since the ledges 18 stop this movement. The side panel 3 is positioned such that the front panel protrusion 19 is inside, at least in part, of a side panel notch 6. There can be one or more front panel protrusions 19 and one or more side panel notches 6. There does not have to be a one-to-one correspondence between each side panel notch 6 and each front panel protrusion 19. Thus, the side panel 3 has a 3-step method of being attached to the front panel 1 to keep it securely attached to the front panel. To keep the side panel 3 from moving away from the front panel 1, the engagement portion 22 is utilized. To keep the side panel 3 from moving side to side, the ledges 18 are utilized. To keep the side panel 3 from moving up and down, the front panel protrusion 19 is utilized. In this way, front panel holding structure including engagement portion 22, ledges 18 and protrusion 19 for holding the front panel and side panels in stationary engagement relative to each other extends from at least a pair of the circumferential extensions formed by the circumferential shelves and between the back face of the front panel and the circumferential terminal end surfaces of the pair of the circumferential extensions. As such. the front panel holding structure defines multiple engagement members that when engaged substantially inhibit separation and limit lateral and vertical movement between the front panel and the side panels.

FIG. 10 includes, without limitation, side panel 3, holding structure 25, channel or groove 26, and recess 11. The view is of the surface of the side panel 3 which faces inside of the wine rack. Channel or groove 26 is configured to receive an edge of back panel 2. Holding structures 25 are configured to be placed inside the back panel notches 8. The channel or groove 26 will keep the side panel 3 from moving side to side relative to the back panel 2. Thus, the channel or groove 26 will keep the side panel 3 from moving to be in a different plane. Instead of channel or groove 26, it is acceptable to have a different structure which will keep an edge of the side panel 3 from moving side to side such as, for example, structures analogous to the ledges 18 of front panel 1. The engagement of the holding structures 25 and the back panel notches 8 will keep the side panel from moving up and down relative to the back panel 2 along a direction substantially along the plane defined by the side panel 3.

Figure 11A:
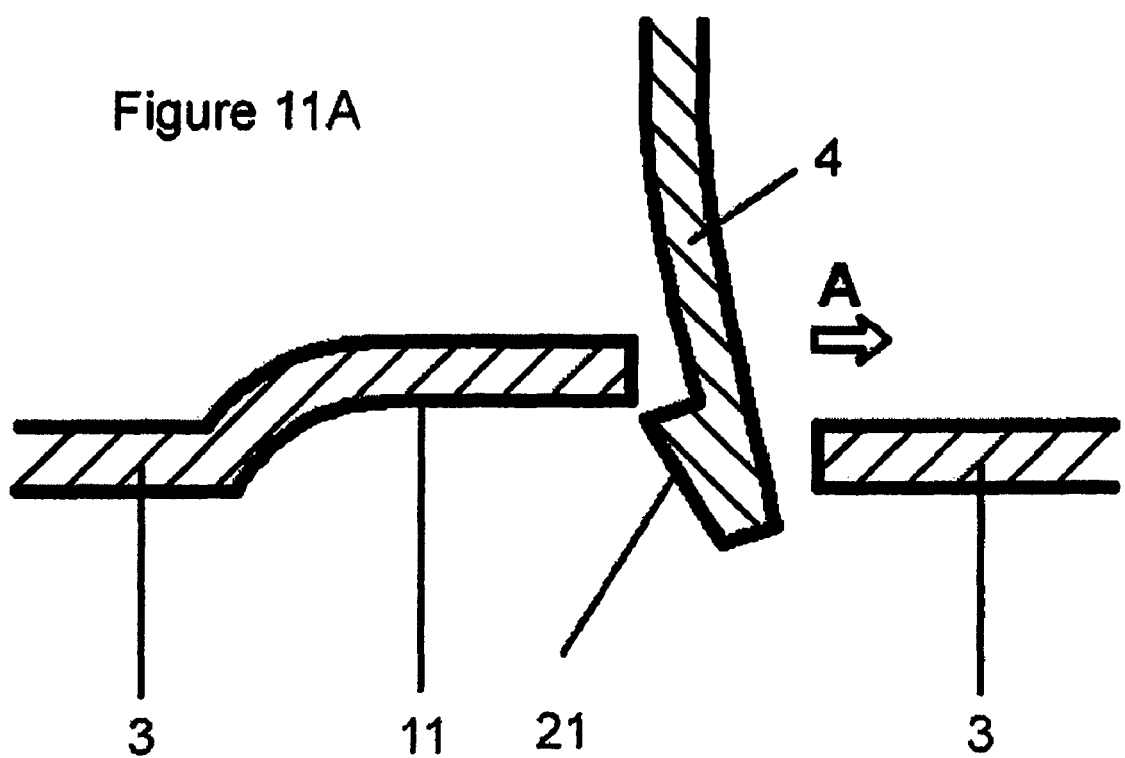
FIGS. 11A and 11B show cross-sections of the snap fit connection along a plane substantially perpendicular to the side panels 3.
Figure 11B:
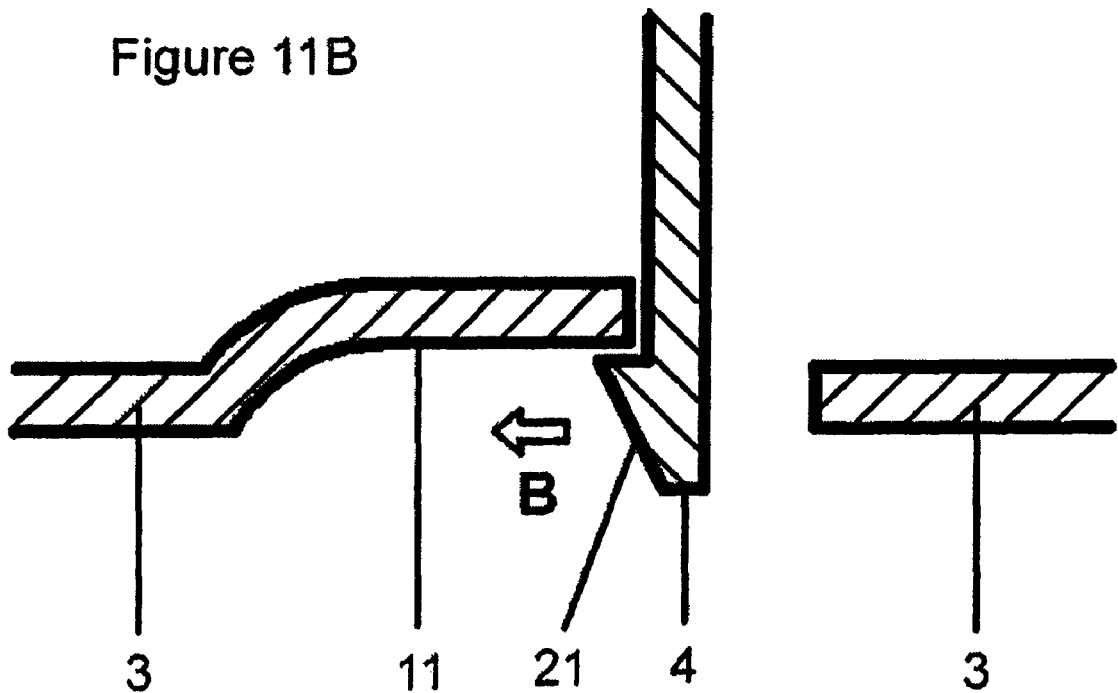

FIGS. 11A and 11B show cross-sections of the snap fit connection along a plane substantially perpendicular to the side panels 3. FIG. 11 includes, without limitation, side panel 3, recess 11, back panel protrusion 4, and step 21. As can be seen, there is engagement between the step 21 and the edge of the recess 11. The aperture though which the back panel protrusion 4 protrudes through the side panel 3 is the fit aperture. A finger or other object can be slide along the recess 11 and push the step 21 (and the back panel protrusion) away from the recess 11 so as to disengage the step 21 from the side panel 3. Then, the back panel 2 and the side panel 3 can be pulled away from one other. For example, if the step 21 is not engaged, the back panel 2 can be pulled away from the side panel 3 along a direction which is substantially along a plane defined by back panel 2. Also, the recess 11, as can be seen in FIGS. 11A and 11B, is at a different level than a surface of side panel 3 such that the extension of the back panel protrusion 4 relative to the surface of the side panel 3 is less when engaged with the recess 11 than it would be if it were engaged directly with the surface of side panel 3.

FIG. 11A shows the insertion of the back panel protrusion 4 through the fit aperture 14, where the step 21 is urged in the direction of arrow A in FIG. 11A as the step 21 goes through the fit aperture 14. Then, once the step 21 is inserted past the fit aperture 14, the step 21 will snap into position by moving in the direction of arrow B in FIG. 11B. Then, the step interferes with the removal of the back panel protrusion 4 from the side panel 3. The snap fit engagement described in FIGS. 11A and 11B is not the only way of attaching and other ways can be utilized as well. Also the same principles of the snap fit connection of FIGS. 11A and 11B also apply to the snap fit connection between engagement step 24 and the engagement opening 23, which is shown in FIG. 8.

FIGS. 1-11 provide information about the present invention. Potential dimensions of some of the parts of the wine rack include wine bottle aperture 13 having a diameter of about 3.75 inches, the height of the wine rack being about 13 inches, the depth of the wine rack being about 8 inches, and the width of the wine rack being about 17 inches. Another option is to have a height of about 12.5 inches, a width of about 16.2 inches, and a depth of about 8.3 inches. The wine rack can conveniently be transported in separate pieces, namely, the front panel 1, the back panel 2, and the two side panels 3 in a disassembled state and be assembled where necessary. The assembly includes attaching the side panels 3 to the front panel 1, and attaching the back panel 2 to the side panels 3. As explained above, the back panel 2 is attached to the side panels 3 by inserting the back panel protrusions 4 through the fit apertures 14 of the side panels 3. The step 21 on the back panel protrusions 4 will help keep the back panel protrusions 4 from exiting the fit apertures 14 on the side panels 3. Also, the back panel 2 will be inserted into the channel or groove 26 and the side panel will this be held from moving side by side and back panel notches 8 will engage the holding structures 25 which are on the channel or groove 26 to keep the side panel 3 will be kept from moving up and down.

The connection of the side panels 3 to the front panel 1 will now be described. There are potentially three attachment systems for attaching the side panels 3 to the front panel 1. First, respective front panel protrusions 19 will be inserted into respective one or more side panel notches 6. This attachment will help keep the side panels 3 from moving from top to bottom when the wine rack is assembled. In other words, this will keep the side panels 3 from moving closer to a top edge or a bottom edge of the front panel 1 in a direction substantially along planes defined by the side panels 3. The body of the front panel protrusion 19 preferably extends in a longitudinal direction which is substantially perpendicular to the height of the side panel 3, the height of the side panel 3 being substantially perpendicular to a direction from the back panel 2 to the front panel 1. However, any orientation of the front panel protrusion 19 which will keep the side panel 3 from moving will suffice. Second, the front panel 1 has one or more ledges 18. The edge portion 20 of the side panel 3 will be inserted between one or more ledges 18 on the front panel 1 such as, for example, one or more pairs of ledges 18 where one pair of ledges 18 includes one ledge 18 on one side of the side panel 3 and the other ledge 18 on the other side of the side panel 3. Thus, the ledges 18 will keep the side panel 3 from moving side to side towards one or the other edge of the front panel 1. Third, the front panel 1 can have at least one engagement portion 22 which defines an engagement opening 23. The engagement steps 24 on the side panel protrusions 5 will end up, at least partially, inside the engagement openings 24 and keep the side panels 3 from moving away from the front panel 1 in a direction substantially along planes defined by the side panels 3. The alignment of the front panel 1 and side panels 3 is such that the attachment of the side panels 3 to the front panel 1 will simultaneously effect the three ways of attaching the side panels 3 to the front panel 1. Thus, the ledges 18, the front panel protrusion 19, and the engagement opening 23 will simultaneously engage the side panels 3 (including the side panel notches 6, the engagement steps 24, and at least the edge portions 20) to keep the side panels 3 and front panel 1 attached and to keep the side panels 3 from moving relative to the front panel 1. The order for assembling the wine rack can be attaching the side panels 3 and the back panel 2 first and then attaching the side panels 3 and the front panel 1 second. Alternatively, the side panels 3 and the front panel 1 can first be attached and then the back panel 2 and the side panels 3 can be attached.

If the disassembly of the wine rack is desired, this is also a possibility. To separate the back panel 2 from the side panels 3, a finger or other object can be slid along the recess 11 or recesses 11 on the side panels 3 to push the back panel protrusion 4 (including step 21) so as to disengage step 21 from the side panel 3. Thus, the back panel protrusions 4 can be released from the fit apertures 14 on the side panels 3. Then, the side panel 3 and back panel 2 can be moved away from one another. To separate the front panel 1 from the side panels 3, the engagement step 24 can be disengaged from the engagement opening 23. To do this, a screwdriver or other tool can be wedged between the side panel 3 and the engagement portion 22 to push the engagement portion 22 and a portion of the side panel 3 adjacent to the engagement portion 22 away from one another sufficiently to disengage the engagement step 24 from the engagement opening 23. Then, the side panel 3 can be pulled away from the front panel 1. The disassembly can be done by detaching the side panels 3 and the front panel 1 first and then detaching the side panels 3 and the back panel 2. Alternatively, the disassembly can be done by detaching the side panels 3 and the back panel 2 first and then detaching the side panels 3 and the front panel 1. Preferably, the side panels 3 will be detached from the back panel 2 first in order to facilitate the detachment of the side panels 3 and the front panel 1 from one another.

One of the advantages of the present invention is the resulting sturdiness of the product. For example, when wine racks are moved and the handle apertures 12 are used to carry or move the wine racks, it is not unusual to have the person who is carrying the wine rack open his arms and put outward pressure on the side panels 3. Thus, there would be pressure on the side panels 3 to move away from the wine rack. However, because of the snap connection involving step 21 and the fit aperture 14, the side panel 3 is held in place and will not move away from the back panel 2. Also, the ledges 18 will keep the side panel 3 from moving away from the front panel 1 since the ledges 18 are keeping the side panels 3 from moving side to side relative to the front panel 1. Similarly, if someone accidentally releases the handle on one side panel 3 and continues to hold a handle on the other side panel 3, the design of the present invention will help reduce the likelihood that the additional weight will pull apart the other side panel 3. Also, if someone pulls the wine rack from one side panel 3 (instead of both), such as sliding the wine rack on the ground by using a handle aperture 12 on one side as a handle, the design of the present invention will help reduce the likelihood that the side panel 3 which is being pulled will separate from the front panel 1 or back panel 2. Thus, the present invention is easy to transport, easy to assemble and disassemble, and is functional and sturdy. Another advantage is the attachment of the side panels 3 to the front panel 1 and the front panel 1 to the side panels 3. For example, the engagement step 24 of the side panel 3 can be inserted into the engagement opening 23 of the front panel 1. Also, the edge portion 20 of the side panel 3 can be inserted between the ledges 18 on the front panel 1. Additionally, the front panel protrusion 19 can be inserted into the side panel notch 6. Also, the edge of back panel 2 can be inserted into the channel or groove 26. Additionally, the holding structures 25 can be inserted into the back panel notches 8. Thus, there are various ways of engagement between the side panels 3 and the front panel 1 and back panel 2, which improves the sturdiness of the wine rack.

The present invention is made of, for example, injection molded plastic. Various plastics can be used, including acrylonitrile butadiene styrene. The plastic is strong enough to provide a sturdy wine rack. There is enough flexibility in the plastic to be able to disassemble the wine rack. The front, back and side panels can be made of plastic. Also, the front panel can be made of wood such as, for example, pine. The wood can be stained.

The invention claimed is:

1. Wine storage system comprising:
   a front panel;
   a back panel; and
   a first and a second side panel, wherein
      said front panel, back panel, and side panels are detachably connected to form a rack defining a plurality of wine bottle apertures, and
      said front panel and back panel each comprise said plurality of wine bottle apertures which are configured to receive wine bottles, said front panel defining a front panel circumferential shelf being adjacent said front panel wine bottle apertures and extending from a front face of said front panel to a back face of said front panel so as to form a circumferential extension protruding from said back face of said front panel toward said back panel at a predetermined distance to hold a bottle of wine thereat, said circumferential extension of each of said circumferential shelves defining a circumferential rim portion defining a circumferential terminal end surface of said circumferential extension, each of said apertures and said circumferential shelves of said front panel corresponding respectively to said wine bottle apertures of said back panel so as to form a support structure for wine bottles to be placed at an incline or at a substantially horizontal position on said rack, and in which front panel holding structure for holding said front panel and side panels in stationary engagement relative to each other extends from at least a pair of said circumferential extensions formed by said circumferential shelves and between said back face of said front panel and said circumferential terminal end surfaces of said pair of said circumferential extensions, said front panel holding structure defining multiple engagement members that when engaged substantially inhibit separation and limit lateral and vertical movement between said front panel and said side panels.

2. Wine storage system according to claim 1, wherein
   a first plane defined by said first side panel and a second plane defined by said second side panel are substantially parallel to one another,
   a third plane defined by the front panel and a fourth plane defined by the back panel are substantially parallel to one another,
   the third and fourth planes are substantially perpendicular to the first and second planes,
   the side panels and the back panel are attached to one another such that peripheral edges of said back panel are adjacent to and face inner surfaces of said side panels,
   the side panels and the front panel are attached to one another such that a peripheral edge of each of said side panels is adjacent to and faces an inner surface of said front panel.

3. Wine storage system according to claim 1, wherein
   each side panel comprises at least one fit aperture,
   said back panel comprises at least one back panel protrusion comprising a step, and
   said back panel protrusion protrudes through said fit aperture when said back panel is attached to said side panel by engagement of the step with a structure of said side panel adjacent to the fit aperture creating a snap fit attachment of said back panel with said side panel.

4. Wine storage system according to claim 3, wherein each said side panel comprises at least one recess and said fit aperture of each side panel is at a base of said recess, said structure of said side panel being located in said recess and said recess permitting a sliding of a finger or other object along said recess so as to press said back panel protrusion to disengage the step of the back panel protrusion from said structure of said side panel.

5. Wine storage system according to claim 1, wherein
   an edge portion of each of said side panels is supported by a structure on said front panel which substantially limits said side panels from moving laterally relative to said front panel.

6. Wine storage system according to claim 1, wherein
   said front panel comprises one or more protrusions on each side of said front panel,
   each of said side panels comprises one or more notches, at least one of said protrusions on each side of said front panel is inserted into a respective notch of each of said side panels to substantially limit the side panels from moving in a vertical direction relative to said front panel, each of said side panels comprises one or more holding structures carried on a surface facing inwardly of the rack, said back panel comprises one or more notches, and at least one of said holding structures on each of said side panels is inserted into a respective notch of said back panel to substantially limit the side panels from moving in a vertical direction relative to said back panel.

7. Wine storage system according to claim 1, wherein said front panel comprises one or more engagement portions on each side of said front panel, each engagement portion defining an engagement opening, each of said side panels comprises at least one side panel protrusion which comprises an engagement step, and said front panel and side panels are configured and assembled so that at least one said engagement step on each of said side panels is at least partly inserted into a respective engagement opening so as to substantially inhibit separation of the side panels from the front panel.

8. Wine storage system according to claim 1, wherein a first plane defined by the first side panel and a second plane defined by the second side panel are substantially parallel to one another, a third plane defined by the front panel and a fourth plane defined by the back panel are substantially parallel to one another, the third and fourth planes are substantially perpendicular to the first and second planes, each said side panel comprises at least one fit aperture, said back panel comprises at least one back panel protrusion comprising a step, said back panel protrusion protrudes through said fit aperture when said back panel is attached to said side panel by engagement of the step with a structure of said side panel adjacent to the fit aperture creating a snap fit attachment of said back panel with said side panel, an edge portion of each of said side panels is inserted between at least two ledges on said Front panel to substantially limit the side panels from laterally moving past the ledges, said side panels comprise an inner surface which faces inside the rack and an outer surface which faces outside the rack, each inner surface and each outer surface of each of said side panels faces at least one ledge and is adjacent to at least one of said at least one ledge, said front panel comprises one or more protrusions on each side of said front panel, each of said side panels comprises one or more notches, at least one of said protrusions on each side of said front panel is inserted into a respective notch of each of said side panels to substantially limit said side panels from moving in a vertical direction relative to said front panel, each of said side panels comprises one or more holding structures on an inner surface, said back panel comprises one or more notches, at least one of said holding structures on each of said side panels is inserted into a respective notch of said back panel to substantially limit the side panels from moving in a vertical direction relative to said back panel, said front panel comprises one or more engagement portions on each side of said front panel, each engagement portion defining an engagement opening, each of said side panels comprises at least one side panel protrusion which comprises an engagement step, and said front panel and side panels are configured and connected so that at least one said engagement step on each of said side panels is at least partly inserted into a respective engagement opening so as to substantially limit said side panels from moving in a direction away from said front panel.

9. Wine storage system according to claim 1, wherein each said side panel comprises at least one handle opening.

10. Wine storage system according to claim 1, wherein a top of said rack carries a structure cooperative with a bottom of another said rack such that racks of like structure are stackable while substantially inhibiting lateral movement of said racks.

* * * * *